US012627569B2

(12) United States Patent
Shami et al.

(10) Patent No.: US 12,627,569 B2
(45) Date of Patent: May 12, 2026

(54) TECHNIQUE FOR DEFINING FEATURES AND PREDICTING LIKELIHOOD OF ADOPTION OF THE SAME USING MACHINE LEARNING MODELS

(71) Applicant: Cisco Technology, Inc., San Jose, CA (US)

(72) Inventors: Mohammad Shami, Foster City, CA (US); Vikramjeet Singh Chauhan, Bellevue, WA (US); Caroline Dahllof, Minnetonka, MN (US)

(73) Assignee: Cisco Technology, Inc., San Jose, CA (US)

( * ) Notice: Subject to any disclaimer, the term of this patent is extended or adjusted under 35 U.S.C. 154(b) by 207 days.

(21) Appl. No.: 18/295,643

(22) Filed: Apr. 4, 2023

(65) Prior Publication Data

US 2024/0340223 A1      Oct. 10, 2024

(51) Int. Cl.
*H04L 41/14*          (2022.01)
*H04L 41/22*          (2022.01)
(52) U.S. Cl.
CPC ............ H04L 41/145 (2013.01); H04L 41/22 (2013.01)
(58) Field of Classification Search
CPC .............................. H04L 41/145; H04L 41/22
USPC ........................................................ 709/224
See application file for complete search history.

(56) References Cited

U.S. PATENT DOCUMENTS

| | | | | |
|---|---|---|---|---|
| 11,743,330 B1 * | 8/2023 | Gilbert | .................... | G06F 21/45 709/203 |
| 12,236,497 B2 * | 2/2025 | Grom et al. | ........... | G06Q 50/26 |
| 2017/0124487 A1 * | 5/2017 | Szeto | .................. | G06F 11/1448 |
| 2017/0337486 A1 | 11/2017 | Zang et al. | | |
| 2018/0032890 A1 | 2/2018 | Podgorny et al. | | |
| 2020/0136949 A1 | 4/2020 | Pant et al. | | |
| 2021/0081377 A1 * | 3/2021 | Polleri | ...................... | G06F 8/75 |

FOREIGN PATENT DOCUMENTS

| | | |
|---|---|---|
| CN | 111615178 | 9/2020 |
| WO | 2022081143 | 4/2022 |

\* cited by examiner

*Primary Examiner* — William C Vaughn, Jr.
(74) *Attorney, Agent, or Firm* — Polsinelli P.C.

(57) ABSTRACT

In one aspect, a method of identifying network features includes receiving a first-time definition of a feature, the feature representing a user query for analytics associated with the feature based on data collected on a plurality of devices in one or more networks, generating the analytics associated with the feature, determining, using a trained machine learning model, a likelihood of adoption of at least the feature by one or more users of the plurality of devices, wherein the trained machine learning model receives as input the first-time definition and provides, as output, the likelihood of adoption of at least the feature, and configuring a user interface on a terminal to provide a visualization of at least one of the likelihood of adoption of at least the feature and the analytics associated with the feature.

20 Claims, 9 Drawing Sheets

700

RECEIVE A DEFINITION OF A FEATURE

702

GENERATE ANALYTICS ASSOCIATED WITH THE FEATURE

704

DETERMINE, USING A TRAINED MACHINE LEARNING MODEL, A LIKELIHOOD OF ADOPTION OF THE FEATURE

706

CONFIGURING A USER INTERFACE ON A TERMINAL TO PROVIDE A VISUALIZATION OF AT LEAST ONE OF THE LIKELIHOOD OF ADOPTION OF AT LEAST THE FEATURE AND THE ANALYTICS ASSOCIATED WITH THE FEATURE

TECHNIQUE FOR DEFINING FEATURES AND PREDICTING LIKELIHOOD OF ADOPTION OF THE SAME USING MACHINE LEARNING MODELS

TECHNICAL FIELD

The present disclosure generally relates to the field of computer networking, and more particularly to analytical tools that provide insight into utilization of network devices and solutions and enable prediction of adoption of various hardware and software features in the network.

BACKGROUND

Enterprise networks and application data centers are typically managed by independent teams, with very little information sharing between the two teams. Data analysts are often asked to define a new feature from existing data and then prepare reports and visualizations to demonstrate the significance (or lack thereof) of the newly defined feature. These projects can be very time consuming and require a lot of work by data analysts to run queries to collect all the data sets needed to compare against the newly defined feature.

BRIEF DESCRIPTION OF THE FIGURES

To provide a more complete understanding of the present disclosure and features and advantages thereof, reference is made to the following description, taken in conjunction with the accompanying drawings, in which.

DETAILED DESCRIPTION

Figure 1:
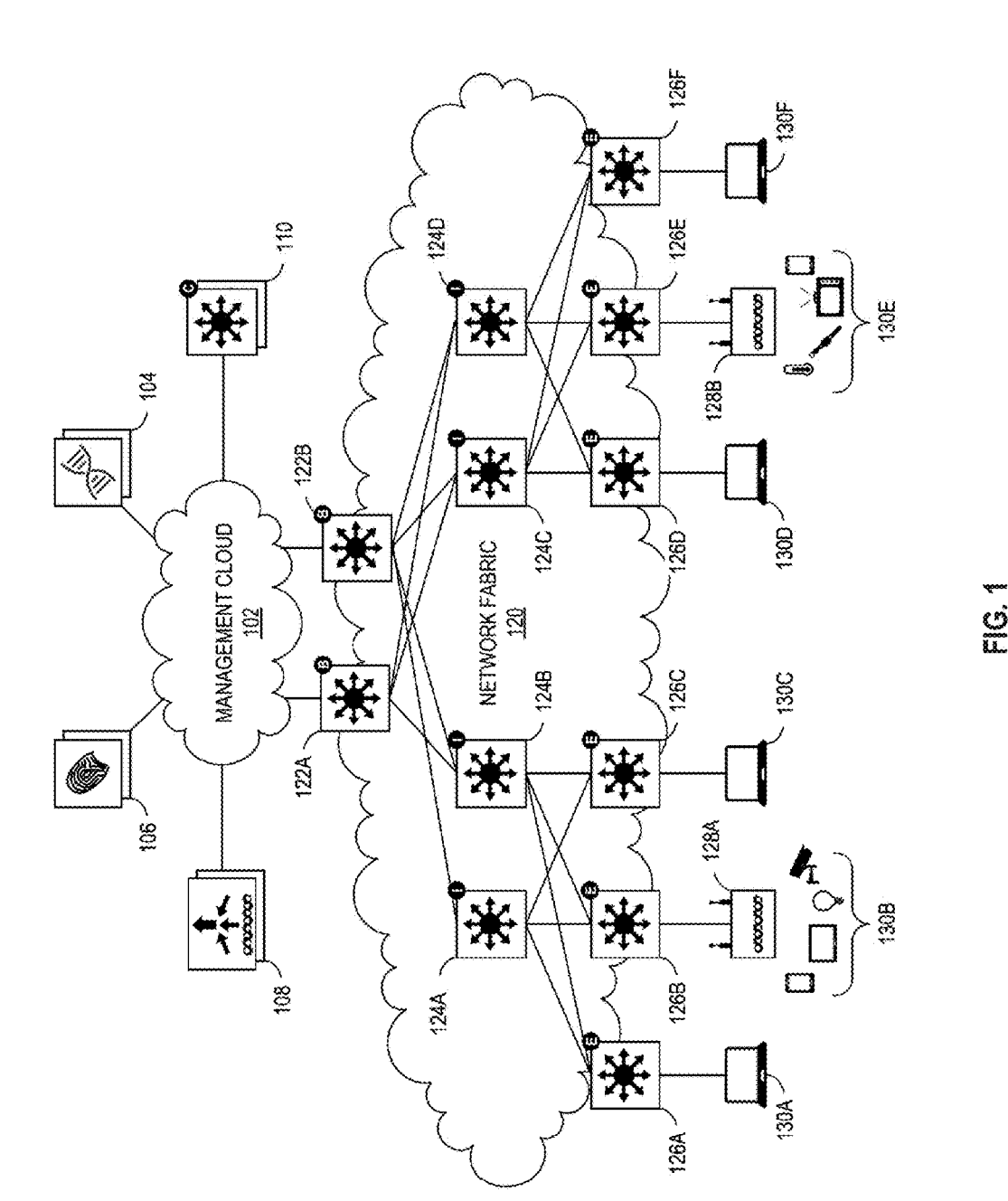
FIG. 1 illustrates an example of a physical topology of an enterprise network according to some aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Techniques described herein are directed to generating/defining features on-the-fly, which may not have been previously defined. These features may be utilized to provide various analytics on a large set of data collected on utilization of different network solutions (e.g., software solutions, hardware devices, etc.) within one or more networks such as enterprise networks. The on-the-fly created feature(s) may also be used to determine the likelihood of adoption of the feature(s) by past, present, and/or future users of the services, products. One or more trained machine learning models may be utilized for on-the-fly creation of features and/or determining their likelihood of adoption.

In one aspect, a method of identifying network features includes receiving a first-time definition of a feature, the feature representing a user query for analytics associated with the feature based on data collected on a plurality of devices in one or more networks, generating the analytics associated with the feature, determining, using a trained machine learning model, a likelihood of adoption of at least the feature by one or more users of the plurality of devices, wherein the trained machine learning model receives as input the first-time definition and provides, as output, the likelihood of adoption of at least the feature, and configuring a user interface on a terminal to provide a visualization of at least one of the likelihood of adoption of at least the feature and the analytics associated with the feature.

In another aspect, the trained machine learning model further receives, as the input, updated information on current utilization of the plurality of devices.

In another aspect, the trained machine learning model further receives, as the input, historical data on device utilization by users of the plurality of devices.

In another aspect, determining the likelihood of adoption of at least the feature is based on the first-time definition, the updated information on current utilization of the plurality of devices, and the historical data on device utilization.

In another aspect, the first-time definition is a description of attributes associated the feature.

In another aspect, the method further includes generating the definition based on the description of the attributes.

In another aspect, the definition is generated using a trained machine learning model that receives the description of the attributes as input, and provides the definition as output.

In one aspect, a network controller includes one or more memories having computer-readable instructions stored therein, and one or more processors. The one or more processors are configured to execute the computer-readable instructions to receive a first-time definition of a feature, the feature representing a user query for analytics associated with the feature based on data collected on a plurality of devices in one or more networks, generate the analytics associated with the feature, determine, using a trained machine learning model, a likelihood of adoption of at least the feature by one or more users of the plurality of devices, wherein the trained machine learning model receives as input the first-time definition and provides, as output, the likelihood of adoption of at least the feature, and configure a user interface on a terminal to provide a visualization of at least one of the likelihood of adoption of at least the feature and the analytics associated with the feature.

In one aspect, one or more non-transitory computer-readable media include computer-readable instructions, which when executed by one or more processors of a network controller, cause the network controller to receive a first-time definition of a feature, the feature representing a user query for analytics associated with the feature based on data collected on a plurality of devices in one or more networks, generate the analytics associated with the feature, determine, using a trained machine learning model, a likelihood of adoption of at least the feature by one or more users of the plurality of devices, wherein the trained machine learning model receives as input the first-time definition and provides, as output, the likelihood of adoption of at least the feature, and configure a user interface on a terminal to provide a visualization of at least one of the likelihood of adoption of at least the feature and the analytics associated with the feature.

Example Embodiments

As noted above, data analysts are often asked to define a new feature from existing data and then prepare reports and visualizations to demonstrate the significance (or lack thereof) of the newly defined feature. These projects can be very time consuming and require a lot of work by data analysts to run queries to collect all the data sets needed to compare against the newly defined feature.

An alternative to this manual process, is an automated analytical tool, variations of which have emerged recently. There are many data systems that can prepare reports and visualizations from a large dataset, (e.g., Google Analytics), but none of these systems allow a user to define a new dataset or a feature for which data exists in the dataset, and automatically receive complied demographic and other data for use in making comparisons and evaluating data from a newly defined feature. Prior art systems rely on previously generated reports, or rely on a data analyst to manually define feature and datasets for comparison.

On many occasions, features and analytics related thereto are generated for purposes of understanding a variety of trends including, but not limited to, trends and patterns in device and service usages, which can then inform decision making processes for better servicing customers with services and/or devices that they are likely to be interested in. However, this aspect of understanding trends is also manual for the most part.

Therefore, there is a need for automated and objective solutions that can predict which features are trending, what a customer might be interested in activating or new products a customer may want to learn about. However, this is a challenging problem when the features or products are rapidly changing or unknown before a model for the purpose of predicting future features is even created. Accordingly, there is a need for a model that can ingest any available data in a dataset, and allow a new feature to be defined, and make predictions on the latest data and newly defined features.

To address the above, the present disclosure provides one or more solutions that can enable a network provider (e.g., an enterprise network provider) to obtain, with relative-ease, insight into a large set of data collected on thousands to millions of hardware and software solutions used by customers. In doing so, the present disclosure allows a user to define a feature on-the-fly. In other words, a feature that may not have been pre-defined, may be defined for the first time. The system can then parse through the vast amount of data collected on the hardware and software solutions to generate one or more different types of analytics on the newly defined feature. The system can further provide the newly defined feature as an input into a trained machine learning model. The trained machine learning model can then provide, as output, various outputs indicative of the likelihood of adoption of the feature (and/or related features) by one or more customers of the network provider.

In the context of the present disclosure, a feature may be defined as any type of software and/or hardware solution that a network provider can provide to its network customers. For example, a feature may be defined as a particular type of router, switch, one or more components of such routers, switches, etc. A feature may be a software solution that can be executed on such hardware components, such as diagnostic solutions, firewall solutions, traffic shaping solutions, security features, network health monitoring solutions, etc.

The disclosure begins with a description of example systems and network architectures in which the concepts of the present disclosure may be implemented.

FIG. 1 illustrates an example of a physical topology of a network 100, that can be an enterprise network, for providing intent-based networking. It should be understood that, for the network 100 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, the network 100 can include any number or type of resources, which can be accessed and utilized by endpoints or network devices. The illustrations and examples provided herein are for clarity and simplicity.

Intent-based networking is an approach for overcoming the deficiencies, discussed above and elsewhere in the present disclosure, of conventional enterprise networks. The motivation of intent-based networking is to enable a user to describe in plain language what he or she wants to accomplish (e.g., the user's intent) and have the network translate the user's objective into configuration and policy changes that are automatically propagated across a complex and heterogeneous computing environment. Thus, an intent-based network can abstract network complexity, automate much of the work of provisioning and managing the network typically handled by a network administrator, and assure secure operation and optimal performance of the network. As an intent-based network becomes aware of the users, devices, and things making connections in the network, it can automatically apply security permissions and service levels in accordance with the privileges and quality of experience (QoE) assigned to the users, devices, and things. Table 1 sets forth examples of intents and workflows that can be automated by an intent-based network to achieve a desired outcome.

assign security and micro-segmentation profiles according to established policies, and continuously monitor access point performance to automatically adjust for QoE;

Users can move freely among network segments, mobile device in hand, and automatically connect with the correct security and access privileges;

Switches, routers, and other network devices can be powered up by local non-technical office personnel, and the network devices can be configured remotely (by a user or by the network) via a cloud management console with the appropriate policies as defined by the intents for the specific location (e.g., permanent employee access, visiting employee access, guest access, etc.); and with Machine learning and artificial intelligence agents running in the network can continuously monitor and analyze network traffic and connections, compare activity against pre-defined intents such as application performance or security policies, detect malware intrusions in encrypted traffic and automatically isolate infected devices, and provide a historical record of network events for analysis and troubleshooting.

The network 100 includes a network management system 102 and a network fabric 120. Although shown as an external network or cloud to the network fabric 120 in this example, the network management system 102 may alternatively or additionally reside on the premises of an organization or in a colocation center (in addition to being hosted by a cloud provider or similar environment). The network management system 102 can provide a central management plane for building and operating the network fabric 120. The network management system 102 can be responsible for forwarding configuration and policy distribution, as well as device management and analytics. The network management system 102 can comprise one or more network controller appliances 104, one or more authentication, authorization, and accounting (AAA) appliances 106, one or more wireless local area network controllers (WLCs) 108, and one or more fabric control plane node(s) 110. In other embodiments, one or more elements of the network management system 102 may be co-located with the network fabric 120.

TABLE 1

| Examples of Intents and Associated Workflows | |
| --- | --- |
| Intent | Workflow |
| I need to scale out my application database | Extend network segments; update load balancer configuration; configure quality of service (QoS) |
| I have scheduled a telemedicine session at 10am | Create high-definition (HD) video connection; prioritize with end-to-end QoS; validate performance; keep the communication safe; tear down connection after call |
| I am rolling out a new IoT app for factory equipment monitoring | Create a new segment for all factory devices to connect to the IoT app; isolate from other traffic; apply service level agreement (SLA); validate SLA; optimize traffic flow |
| I need to deploy a secure multi-tier application | Provision multiple networks and subnets; configure access control lists (ACLs) and firewall rules; advertise routing information |

Some additional examples of use cases of an intent-based network:

An intent-based network can learn the performance needs of applications and services and adapt the network from end-to-end to achieve specified service levels;

Instead of sending technicians to every office, floor, building, or branch, an intent-based network can discover and identify devices and things as they connect, The network controller appliance(s) 104 can function as the command and control system for one or more network fabrics, and can house automated workflows for deploying and managing the network fabric(s). The network controller appliance(s) 104 can include automation, design, policy, provisioning, and assurance capabilities, among others, as discussed further below with respect to FIG. 2. In some embodiments, one or more Cisco Digital Network Architecture (Cisco DNA™) appliances can operate as the network controller appliance(s) 104.

The AAA appliance(s) 106 can control access to computing resources, facilitate enforcement of network policies, audit usage, and provide information necessary to bill for services. The AAA appliance can interact with the network controller appliance(s) 104 and with databases and directories containing information for users, devices, things, policies, billing, and similar information to provide authentication, authorization, and accounting services. In some embodiments, the AAA appliance(s) 106 can utilize Remote Authentication Dial-In User Service (RADIUS) or Diameter to communicate with devices and applications. In some embodiments, one or more Cisco® Identity Services Engine (ISE) appliances can operate as the AAA appliance(s) 106.

The WLC(s) 108 can support fabric-enabled access points attached to the network fabric 120, handling traditional tasks associated with a WLC as well as interactions with the fabric control plane for wireless endpoint registration and roaming. In some embodiments, the network fabric 120 can implement a wireless deployment that moves data-plane termination (e.g., VXLAN) from a centralized location (e.g., with previous overlay Control and Provisioning of Wireless Access Points (CAPWAP) deployments) to an access point/ fabric edge node. This can enable distributed forwarding and distributed policy application for wireless traffic while retaining the benefits of centralized provisioning and administration. In some embodiments, one or more Cisco® Wireless Controllers, Cisco® Wireless LAN, and/or other Cisco DNA™-ready wireless controllers can operate as the WLC(s) 108.

The network fabric 120 can comprise fabric border nodes 122A and 122B (collectively, 122), fabric intermediate nodes 124A-D (collectively, 124), and fabric edge nodes 126A-F (collectively, 126). Although the fabric control plane node(s) 110 are shown to be external to the network fabric 120 in this example, in other embodiments, the fabric control plane node(s) 110 may be co-located with the network fabric 120. In embodiments where the fabric control plane node(s) 110 are co-located with the network fabric 120, the fabric control plane node(s) 110 may comprise a dedicated node or set of nodes or the functionality of the fabric control node(s) 110 may be implemented by the fabric border nodes 122.

The fabric control plane node(s) 110 can serve as a central database for tracking all users, devices, and things as they attach to the network fabric 120, and as they roam around. The fabric control plane node(s) 110 can allow network infrastructure (e.g., switches, routers, WLCs, etc.) to query the database to determine the locations of users, devices, and things attached to the fabric instead of using a flood and learn mechanism. In this manner, the fabric control plane node(s) 110 can operate as a single source of truth about where every endpoint attached to the network fabric 120 is located at any point in time. In addition to tracking specific endpoints (e.g., /32 address for IPv4, /128 address for IPV6, etc.), the fabric control plane node(s) 110 can also track larger summarized routers (e.g., IP/mask). This flexibility can help in summarization across fabric sites and improve overall scalability.

The fabric border nodes 122 can connect the network fabric 120 to traditional Layer 3 networks (e.g., non-fabric networks) or to different fabric sites. The fabric border nodes 122 can also translate context (e.g., user, device, or thing mapping and identity) from one fabric site to another fabric site or to a traditional network. When the encapsulation is the same across different fabric sites, the translation of fabric context is generally mapped 1:1. The fabric border nodes 122 can also exchange reachability and policy information with fabric control plane nodes of different fabric sites. The fabric border nodes 122 also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route).

The fabric intermediate nodes 124 can operate as pure Layer 3 forwarders that connect the fabric border nodes 122 to the fabric edge nodes 126 and provide the Layer 3 underlay for fabric overlay traffic.

The fabric edge nodes 126 can connect endpoints to the network fabric 120 and can encapsulate/decapsulate and forward traffic from these endpoints to and from the network fabric. The fabric edge nodes 126 may operate at the perimeter of the network fabric 120 and can be the first points for attachment of users, devices, and things and the implementation of policy. In some embodiments, the network fabric 120 can also include fabric extended nodes (not shown) for attaching downstream non-fabric Layer 2 network devices to the network fabric 120 and thereby extend the network fabric. For example, extended nodes can be small switches (e.g., compact switch, industrial Ethernet switch, building automation switch, etc.) which connect to the fabric edge nodes via Layer 2. Devices or things connected to the fabric extended nodes can use the fabric edge nodes 126 for communication to outside subnets.

In this example, the network fabric can represent a single fabric site deployment which can be differentiated from a multi-site fabric deployment as discussed further below.

In some embodiments, all subnets hosted in a fabric site can be provisioned across every fabric edge node 126 in that fabric site. For example, if the subnet 10.10.10.0/24 is provisioned in a given fabric site, this subnet may be defined across all of the fabric edge nodes 126 in that fabric site, and endpoints located in that subnet can be placed on any fabric edge node 126 in that fabric. This can simplify IP address management and allow deployment of fewer but larger subnets. In some embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-Ready™ devices can operate as the fabric nodes 122, 124, and 126.

The network 100 can also include wired endpoints 130A, 130C, 130D, and 130F and wireless endpoints 130B and 130E (collectively, 130). The wired endpoints 130A, 130C, 130D, and 130F can connect by wire to fabric edge nodes 126A, 126C, 126D, and 126F, respectively, and the wireless endpoints 130B and 130E can connect wirelessly to wireless access points 128B and 128E (collectively, 128), respectively, which in turn can connect by wire to fabric edge nodes 126B and 126E, respectively. In some embodiments, Cisco Aironet® access points, Cisco Meraki® MR access points, and/or other Cisco DNA™-ready access points can operate as the wireless access points 128.

The endpoints 130 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), car devices, etc.), and so forth. The endpoints 130 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some embodiments, the network fabric 120 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the WLC(s) 108 notifying the fabric control plane node(s) 110 of joins, roams, and disconnects by the wireless endpoints 130 such that the fabric control plane node(s) can have connectivity information about both wired and wireless endpoints in the network fabric 120, and can serve as the single source of truth for endpoints connected to the network fabric. For data plane integration, the WLC(s) 108 can instruct the fabric wireless access points 128 to form a VXLAN overlay tunnel to their adjacent fabric edge nodes 126. The AP VXLAN tunnel can carry segmentation and policy information to and from the fabric edge nodes 126, allowing connectivity and functionality identical or similar to that of a wired endpoint. When the wireless endpoints 130 join the network fabric 120 via the fabric wireless access points 128, the WLC(s) 108 can onboard the endpoints into the network fabric 120 and inform the fabric control plane node(s) 110 of the endpoints' Media Access Control (MAC) addresses. The WLC(s) 108 can then instruct the fabric wireless access points 128 to form VXLAN overlay tunnels to the adjacent fabric edge nodes 126. Next, the wireless endpoints 130 can obtain IP addresses for themselves via Dynamic Host Configuration Protocol (DHCP). Once that completes, the fabric edge nodes 126 can register the IP addresses of the wireless endpoint 130 to the fabric control plane node(s) 110 to form a mapping between the endpoints' MAC and IP addresses, and traffic to and from the wireless endpoints 130 can begin to flow.

Figure 2:
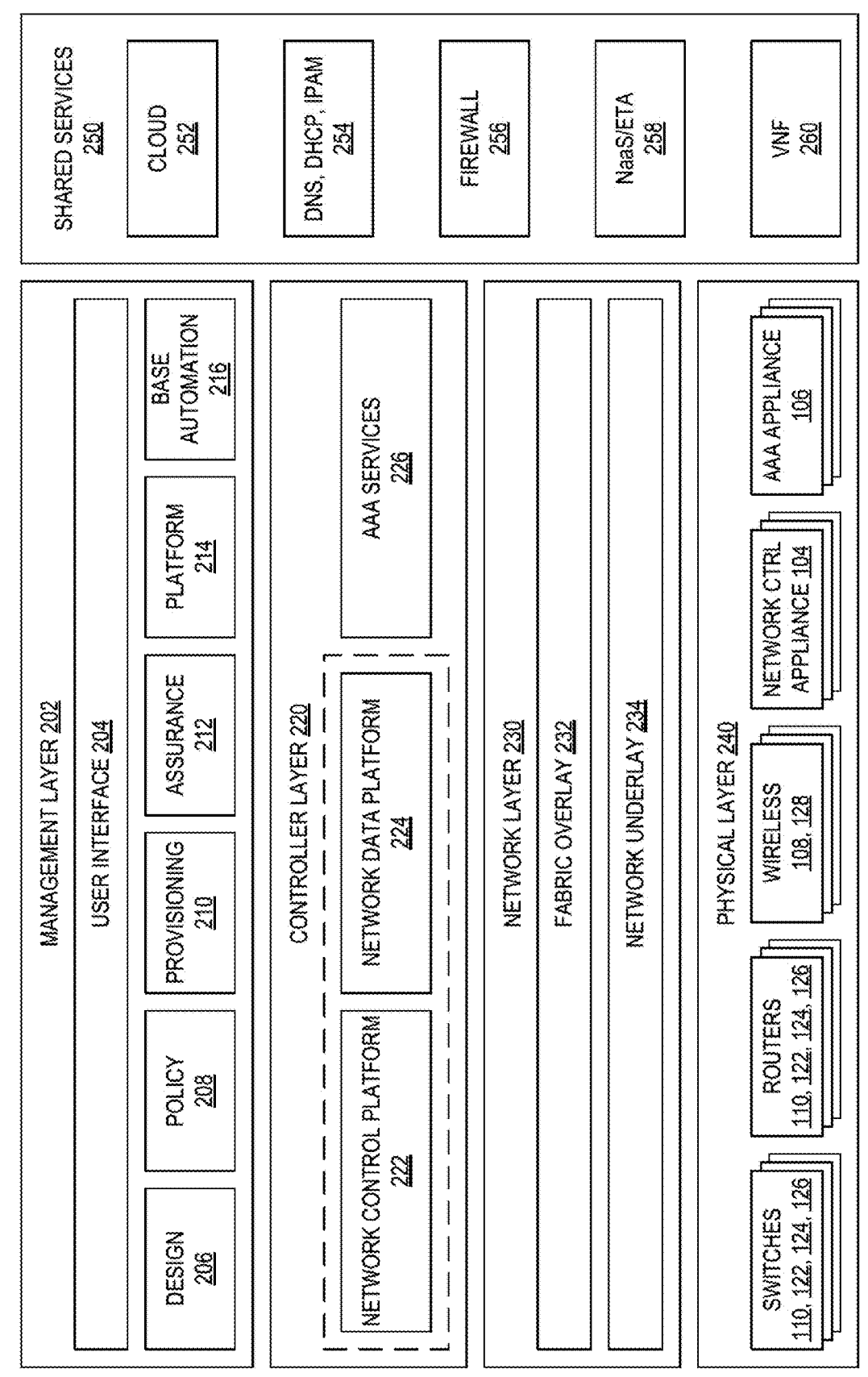
FIG. 2 illustrates an example of a logical architecture for an enterprise network according to some aspects of the present disclosure.

FIG. 2 illustrates an example of a logical architecture 200 for the network 100 (e.g., an enterprise network), according to some aspects of the present disclosure. One of ordinary skill in the art will understand that, for the logical architecture 200 and any system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure. In this example, the logical architecture 200 includes a management layer 202, a controller layer 220, a network layer 230 (such as embodied by the network fabric 120), a physical layer 240 (such as embodied by the various elements of FIG. 1), and a shared services layer 250.

The management layer 202 can abstract the complexities and dependencies of other layers and provide a user with tools and workflows to manage the network 100 (e.g., an enterprise network). The management layer 202 can include a user interface 204, design functions 206, policy functions 208, provisioning functions 210, assurance functions 212, platform functions 214, and base automation functions 216. The user interface 204 can provide a user a single point to manage and automate the network. The user interface 204 can be implemented within a web application/web server accessible by a web browser and/or an application/application server accessible by a desktop application, a mobile app, a shell program or other command line interface (CLI), an Application Programming Interface (e.g., restful state transfer (REST), Simple Object Access Protocol (SOAP), Service Oriented Architecture (SOA), etc.), and/or other suitable interface in which the user can configure network infrastructure, devices, and things that are cloud-managed; provide user preferences; specify policies, enter data; review statistics; configure interactions or operations; and so forth. The user interface 204 may also provide visibility information, such as views of a network, network infrastructure, computing devices, and things. For example, the user interface 204 can provide a view of the status or conditions of the network, the operations taking place, services, performance, a topology or layout, protocols implemented, running processes, errors, notifications, alerts, network structure, ongoing communications, data analysis, and so forth.

The design functions 206 can include tools and workflows for managing site profiles, maps and floor plans, network settings, and IP address management, among others. The policy functions 208 can include tools and workflows for defining and managing network policies. The provisioning functions 210 can include tools and workflows for deploying the network. The assurance functions 212 can use machine learning and analytics to provide end-to-end visibility of the network by learning from the network infrastructure, endpoints, and other contextual sources of information. The platform functions 214 can include tools and workflows for integrating the network management system with other technologies. The base automation functions 216 can include tools and workflows to support the policy functions 208, the provisioning functions 210, the assurance functions 212, and the platform functions 214.

In some embodiments, the design functions 206, the policy functions 208, the provisioning functions 210, the assurance functions 212, the platform functions 214, and the base automation functions 216 can be implemented as microservices in which respective software functions are implemented in multiple containers communicating with each rather than amalgamating all tools and workflows into a single software binary. Each of the design functions 206, policy functions 208, provisioning functions 210, assurance functions 212, and platform functions 214 can be viewed as a set of related automation microservices to cover the design, policy authoring, provisioning, assurance, and cross-platform integration phases of the network lifecycle. The base automation functions 216 can support the top-level functions by allowing users to perform certain network-wide tasks.

With example network topologies and architectures described above with reference to FIGS. 1 and 2, the disclosure now turns to solutions provided by the present disclosure. As described, the present disclosure provides one or more solutions that can enable a network provider (e.g., an enterprise network provider) to obtain, with relative-case, insight into a large set of data collected on thousands to millions of hardware and software solutions used by customers. In doing so, the present disclosure allows a user to define a feature on-the-fly. In other words, a feature that may not have been pre-defined, may be defined for the first time. The system can then parse through the vast amount of data collected on the hardware and software solutions to generate one or more different types of analytics on the newly defined feature. The system can further provide the newly defined feature as an input into a trained machine learning model. The trained machine learning model can then provide, as output, various outputs indicative of the likelihood of adoption of the feature (and/or related features) by one or more customers of the network provider.

In one aspect and as various customers implement an enterprise network such as network 100 described above with reference to FIG. 1, a network controller (e.g., network controller appliance 104) may collect various statistics on each customer related to hardware and/or software solutions purchased/subscribed to by each customer, utilization of such hardware and/or software solutions, frequency of upgrades, etc., across a customer's entire organization. This process may be performed in real-time, periodically, etc.

Accordingly, over time, a large amount of data may be collected on hardware/software utilization by different customers. This data may be stored in one or more databases and present a valuable pool of information that can be tapped by a network operator to understand how hardware, software, and/or services offered by a network provider of network 100 is utilized, what insight they can provide into additional hardware, software, and/or services that one or more customers may be interested in, etc. Understanding this large pool of data in an objective manner and the effective use thereof in understanding trends in utilization of software and hardware solutions, is a technological problem the solution to which relies on special purpose-trained machine learning techniques and computer-implemented data science and mathematical approaches.

One technical challenge being addressed is how to enable users who are interested in understanding the stored data to define a feature they are interested in that may not necessarily be available among a set of pre-defined and already available features. A feature may be any parameter representative/indicative of a software or a hardware solution that is used by one or more customers in the past, currently, and/or possibly in the future.

In describing various example embodiments below, references may be made to non-limiting examples of Cisco Meraki hardware products and associated software solutions. However, example embodiments are not limited thereto. The example embodiments and associated models can be trained to apply equally to any other type of network, its components, and/or software provided by any provider of networking solutions.

A feature may be defined as a single term that clearly specifies a hardware or a software solution (e.g., Meraki MX, Switch XYZ, etc.) or may be a combination of words (e.g., a set of attributes in the form of one or more sentences) that indicate a query into particular usage trend, device types, etc. For instance, a feature may be provided as "How many users made two clicks within alert hub in the last 30 days of X?," "how many organizations have an active MV Sense License on day X?," "How many organizations have made at least 10 API calls on day X?," etc.). In this instance, it may be said that the feature is defined on-the-fly using a set of attributes.

In one example, a trained machine learning model may be utilized that can receive, as input, a set of attributes and provide, as output, a feature that may then be used as the basis for performing a specified type of analytics on the database of device utilization data to determine various types of statistics related to the feature. For instance, such machine learning model (an example of which will be described below with reference to FIG. 4) may receive, as input, "how many organizations have active Meraki camera related analytical licenses?" Based on one or more natural language processing techniques, in combination with historical data on the network and its components, etc., the model can generate a feature (e.g., MV Sense License) and provide the same as output. In another example, the output can include, in addition to an identified feature, other metadata and attributes associated with the generated feature such as customer ID of any customer having an MV Sense License, a date, whether the license is active/inactive, etc. The output can be provided in a tabular form and/or alternatively as a visual output.

Figure 3A:
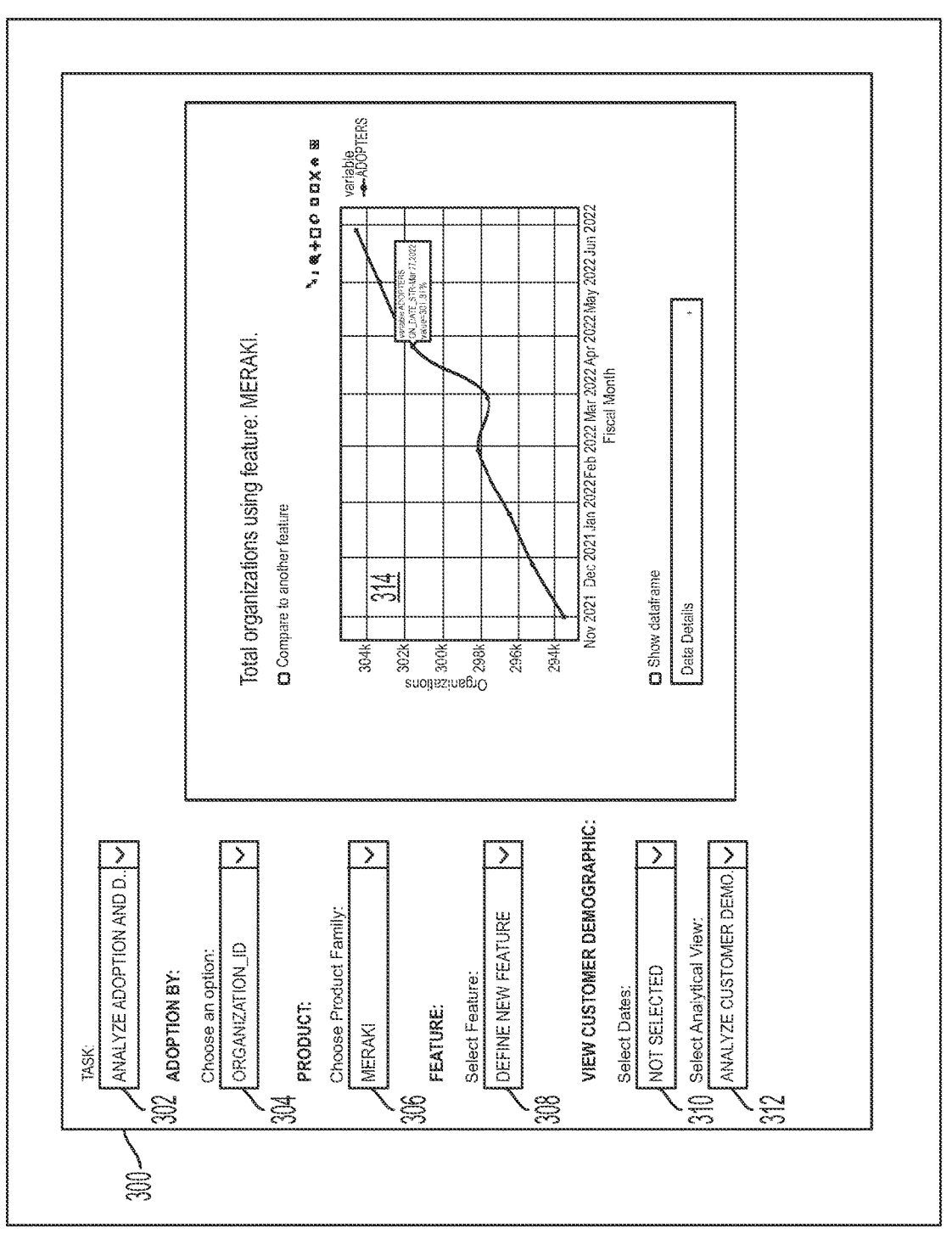
FIG. 3A is an example screenshot of a user interface for defining a feature according to some aspects of the present disclosure.

FIG. 3A is an example screenshot of a user interface for defining a feature according to some aspects of the present disclosure. Example user interface 300 can include a number of options for specifying parameters and/or attributes associated with a feature of interest and the type of analytics to be generated and extracted for the feature of interest. For example, dropdown menu 302 can be used to specify an analytical task to be performed (e.g., analyze adoption and demographic). Another dropdown menu 304 can be used to specify a parameter based on which the analytical task should be grouped (e.g., by organization ID). Dropdown menu 306 can be used a product family for which the analytical task is to be performed (e.g., Cisco Meraki products). Dropdown menu 308 can be used to specify a feature. The feature may be selected from a list of existing and pre-defined features. One such option can be "define new feature," which can be used to identify an on-the-fly/ new feature in the form of a specific feature (e.g., a specific product, software, license, etc.) or a set of attributes associated with a feature such as one of those examples described above.

Other options can include dropdown menu 310 via which a date range for the analytical task may be identified, a dropdown menu 312 for selecting an analytical view (e.g., analyze customer adoption), etc.

Once all relevant options and parameters are specified, an output of the analytical task (e.g., adoption of Meraki products by customers) may be presented as output (graph) 314 on user interface 300.

Figure 3B:
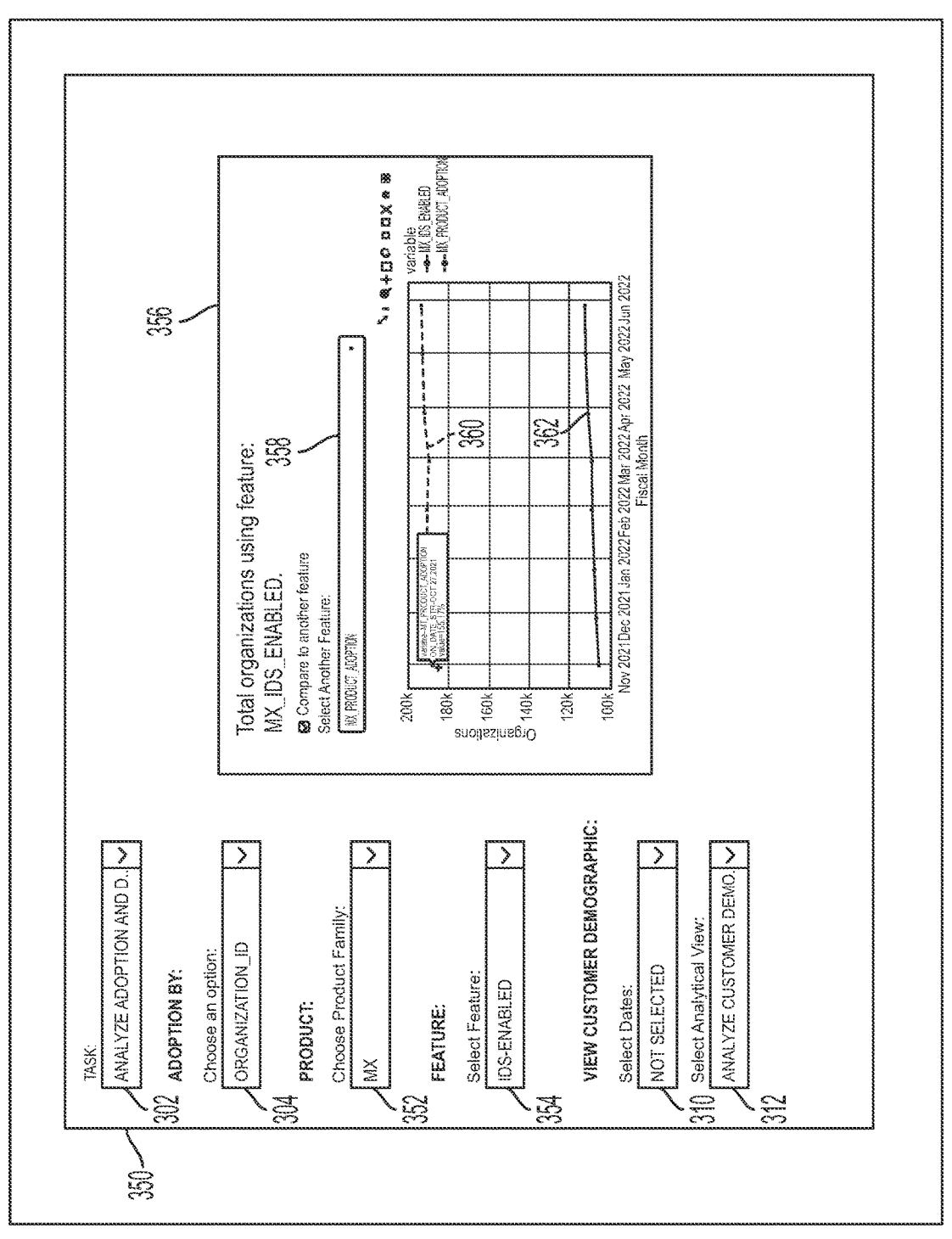
FIG. 3B illustrates another example screenshot of a user interface for defining a feature according to some aspects of the present disclosure.

FIG. 3B illustrates another example screenshot of a user interface for defining a feature according to some aspects of the present disclosure. Example user interface 350 can include similar options for specifying parameters and/or attributes associated with a feature of interest. Options for specifying attributes that are the same as those in FIG. 3A are numbered the same in FIG. 3B and hence will not be described again for sake of brevity.

In comparison to FIG. 3A, dropdown menus 352 and 354 may be different. For example, dropdown menu 352 can be used to select a different product (e.g., Meraki MX) and dropdown menu 354 can be used to define/select another feature such as an active intrusion detection solution (e.g., IDS_Enabled).

Furthermore, in comparison with FIG. 3A, output 356 may allow a user to visualize a comparison of a feature of interest (e.g., IDS_Enabled) with another feature (e.g., MX_Product_Adoption). In one example, the feature to be compared to the feature of interest may be selected via a dropdown menu 358. Visualization of the comparison can be seen as output (graph) 360 (e.g., corresponding to MX_Product_Adoption) and output (graph) 362 (e.g., IDS_Enabled).

An aspect of the present disclosure is directed to enabling an on-the-fly creation (generation and/or defining) of a new feature. A new feature may be defined based on a number of attributes including but not limited to, customer ID, date, feature name, active/inactive status, etc. Once attributes of a new feature are received and inputted into a trained machine learning model, the trained machine learning model may analyze the attributes and provide as output at least on visualization of the newly defined feature such as output 314 of FIG. 3A and output 356 of FIG. 3B.

Figure 4:
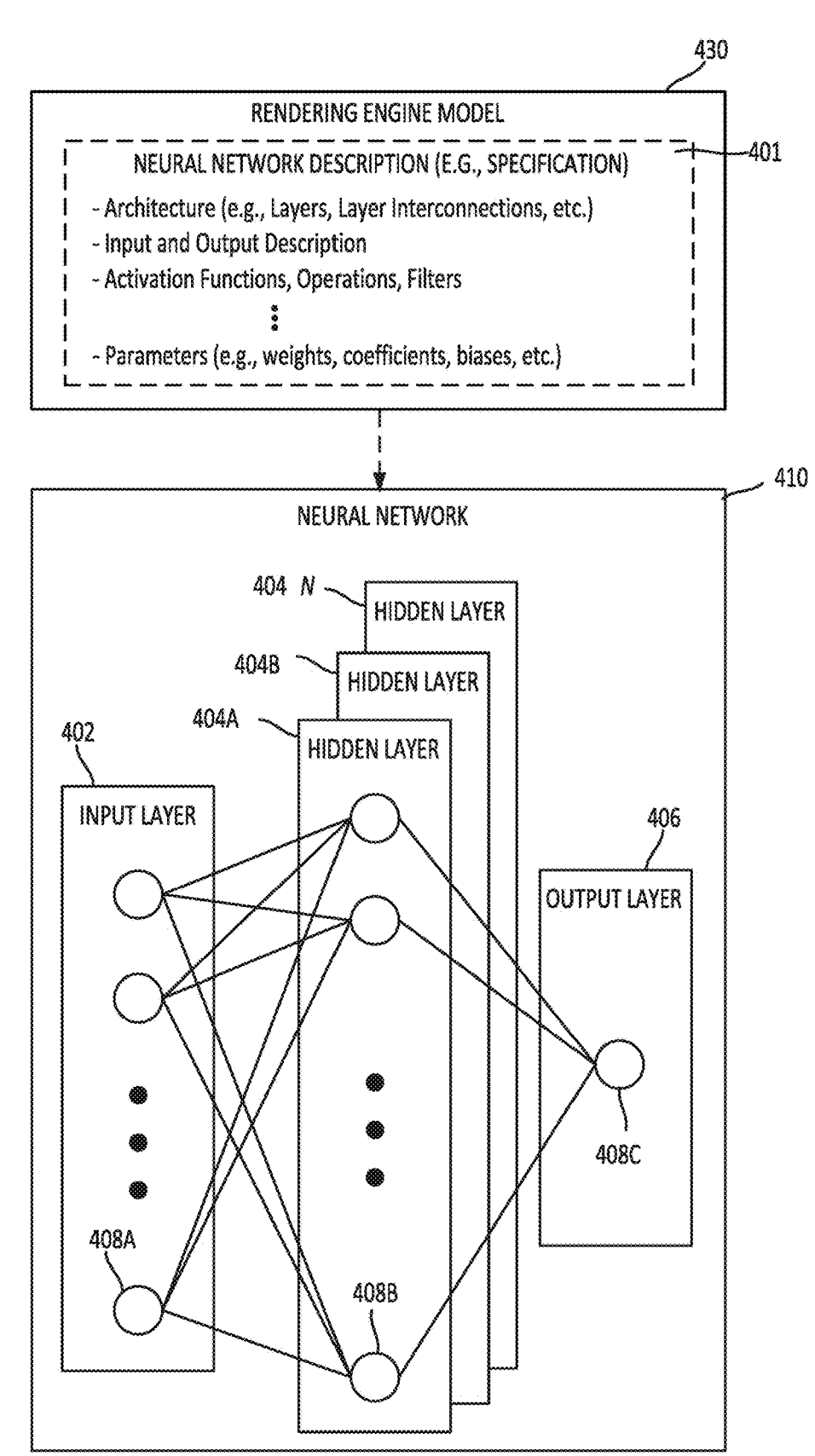
FIG. 4 illustrates an example neural network that can be utilized for feature definition and analysis according to some aspects of the present disclosure.

FIG. 4 illustrates an example neural network that can be utilized for feature definition and analysis according to some aspects of the present disclosure. In some examples, such neural network can also be trained to receive feature attributes and provide an analysis thereof.

Architecture 400 includes a neural network 410 defined by an example neural network description 401 in rendering engine model (neural controller) 430. Neural network 410 can be used for feature definition and analysis. Neural network description 401 can include a full specification of neural network 410. For example, neural network description 401 can include a description or specification of the architecture of neural network 410 (e.g., the layers, layer interconnections, number of nodes in each layer, etc.); an input and output description which indicates how the input and output are formed or processed; an indication of the activation functions in the neural network, the operations or filters in the neural network, etc.; neural network parameters such as weights, biases, etc.; and so forth.

In this example, neural network 410 includes an input layer 402, which can receive input data including, but not limited to, a defined feature and/or attributes of an on-the-fly feature being defined for analysis at the time of providing inputs to the neural network 410.

Neural network 410 includes hidden layers 404A through 404N (collectively "404" hereinafter). Hidden layers 404 can include n number of hidden layers, where n is an integer greater than or equal to one. The number of hidden layers can include as many layers as needed for a desired processing outcome and/or rendering intent. Neural network 410 further includes an output layer 406 that provides as output, labeled and/or located defects in a scanned battery cell. The output can additionally or alternatively be a recommended corrective actions, as described above.

Neural network 410 in this example is a multi-layer neural network of interconnected nodes. Each node can represent a piece of information. Information associated with the nodes is shared among the different layers and each layer retains information as information is processed. In some cases, neural network 410 can include a feed-forward neural network, in which case there are no feedback connections where outputs of the neural network are fed back into itself. In other cases, neural network 410 can include a recurrent neural network, which can have loops that allow information to be carried across nodes while reading in input.

Information can be exchanged between nodes through node-to-node interconnections between the various layers. Nodes of input layer 402 can activate a set of nodes in first hidden layer 404A. For example, as shown, each of the input nodes of input layer 402 is connected to each of the nodes of first hidden layer 404A. The nodes of hidden layer 404A can transform the information of each input node by applying activation functions to the information. The information derived from the transformation can then be passed to and can activate the nodes of the next hidden layer (e.g., 404B), which can perform their own designated functions. Example functions include convolutional, up-sampling, data transformation, pooling, and/or any other suitable functions. The output of the hidden layer (e.g., 404B) can then activate nodes of the next hidden layer (e.g., 404N), and so on. The output of the last hidden layer can activate one or more nodes of output layer 406, at which point an output is provided. In some cases, while nodes (e.g., nodes 408A, 408B, 408C) in neural network 410 are shown as having multiple output lines, a node has a single output and all lines shown as being output from a node represent the same output value.

In some cases, each node or interconnection between nodes can have a weight that is a set of parameters derived from training neural network 410. For example, an interconnection between nodes can represent a piece of information learned about the interconnected nodes. The interconnection can have a numeric weight that can be tuned (e.g., based on a training dataset), allowing neural network 410 to be adaptive to inputs and able to learn as more data is processed.

Neural network 410 can be pre-trained to process the features from the data in the input layer 402 using the different hidden layers 404 in order to provide the output through output layer 406. In this example, neural network 410 can be trained using training data. The training data can be a subset of data stored in a database of feature data that may be continuously collected on various network elements and/or features utilized by network elements in the network. Another subset of the data stored in such database can be used for purposes of validating the training of neural network 410.

In one or more examples, training of neural network 410 may be supervised, whereby the model is trained using labeled datasets whereby one or more aspects of neural network 410, such as weights, biases, etc., are tuned until neural network 410 returns the expected result for a given type of battery cell. In other examples, the training may be unsupervised.

In some examples, the training may be based on zero-shot learning and/or transfer learning.

In some cases, neural network 410 can adjust weights of nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training media data until the weights of the layers are accurately tuned.

For a first training iteration for neural network 410, the output can include values that do not give preference to any particular class due to the weights being randomly selected at initialization. For example, if the output is a vector with probabilities that the object includes different product(s) and/or different users, the probability value for each of the different product and/or user may be equal or at least very similar (e.g., for ten possible products or users, each class may have a probability value of 0.1). With the initial weights, neural network 410 is unable to determine low level features and thus cannot make an accurate determination of what the classification of the object might be. A loss function can be used to analyze errors in the output. Any suitable loss function definition can be used.

The loss (or error) can be high for the first training dataset (e.g., images) since the actual values will be different than the predicted output. The goal of training is to minimize the amount of loss so that the predicted output comports with a target or ideal output. Neural network 410 can perform a backward pass by determining which inputs (weights) most contributed to the loss of neural network 410 and can adjust the weights so that the loss decreases and is eventually minimized.

A derivative of the loss with respect to the weights can be computed to determine the weights that contributed most to the loss of neural network 410. After the derivative is computed, a weight update can be performed by updating the weights of the filters. For example, the weights can be updated so that they change in the opposite direction of the gradient. A learning rate can be set to any suitable value, with a high learning rate including larger weight updates and a lower value indicating smaller weight updates.

Neural network 410 can include any suitable neural or deep learning network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. In other examples, neural network 710 can represent any other neural or deep learning network, such as an autoencoder, a deep belief networks (DBN), a recurrent neural network (RNN), etc.

As noted above, in one aspect, the present disclosure allows a user to define a feature on-the-fly and be able to study various analytics for the newly defined feature. In another aspect, on-the-fly created feature(s) may also be used to determine the likelihood of adoption of the feature(s) by past, present, and/or future users of the services, products. One or more trained machine learning models may be utilized for on-the-fly creation of features and/or determining their likelihood of adoption.

In one aspect, a trained ML model that can accept a custom query such as an on-the-fly defined feature described above, to predict adoption of any feature. The feature can be custom defined just prior to input into the model. The database for which the model makes its predictions on may be dynamic. New features can be defined at anytime, and usage data, adoption data, and other data is always in flux, as is common with a data lake.

In some examples, upon selection (possibly created of a feature) of the feature of interest, the model creates/updates profiles of customers to account for the new feature of interest, and determines a likelihood that customers will adopt the feature and provide analysis of aspects of the analysis upon which the output sensitive. These aspects will be further described below with reference to FIGS. 5 and 6.

Figure 5:
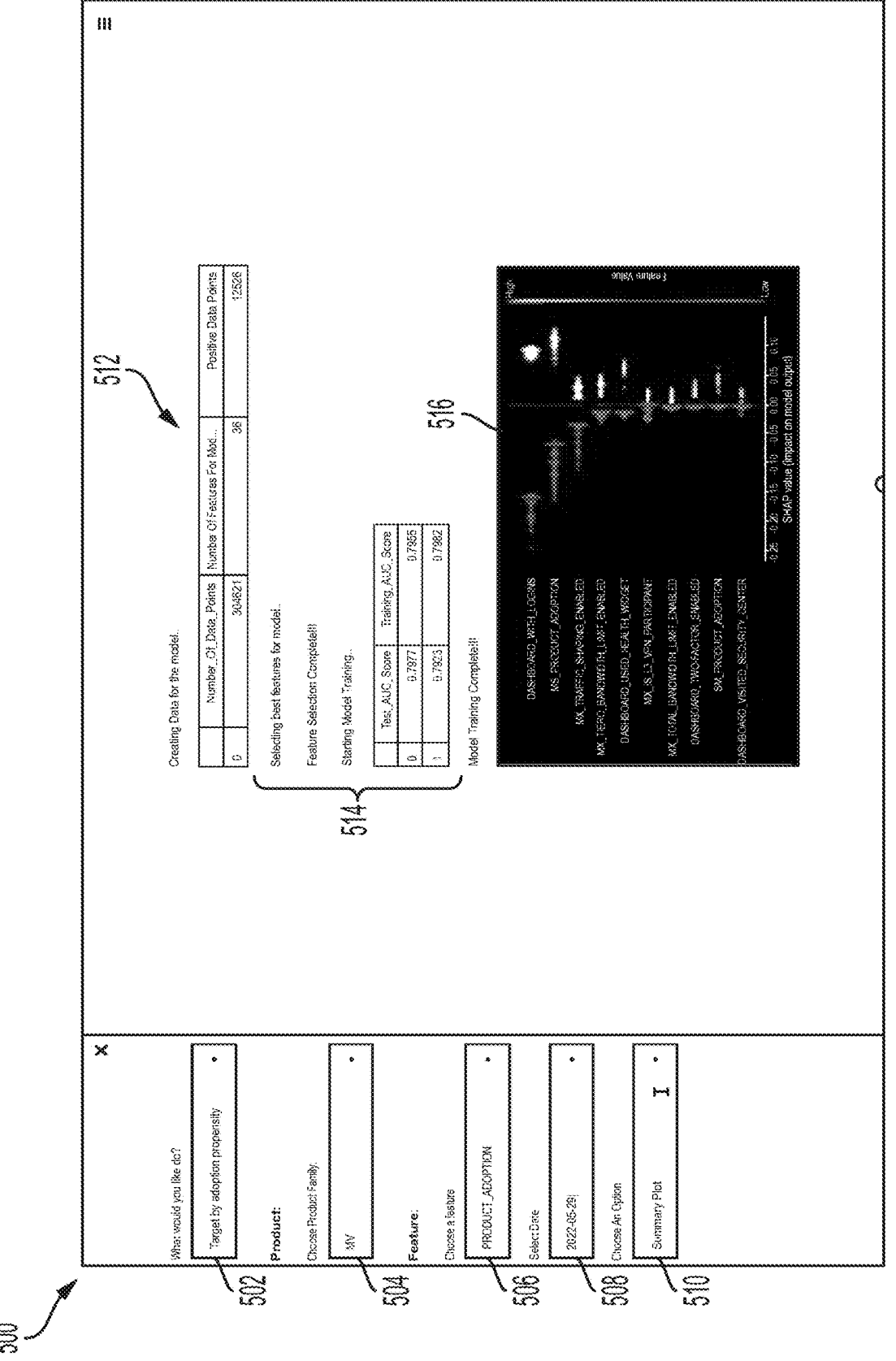
FIG. 5 provides an example output of a trained machine learning algorithm indicative of feature analysis according to some aspects of the present disclosure.

FIG. 5 provides an example output of a trained machine learning algorithm indicative of feature analysis according to some aspects of the present disclosure. As can be seen from non-limiting example user interface 500, a number of options for feature adoption and analysis may be selected. For instance, one option 502 may be to select the desired task, which can be 'Target by adoption propensity'. Another option 504 may be the product to which a feature is application such as Meraki Video (MV). Another option 506 may be a feature of interest such as product_adoption. Other optional features 508 and 510 can include, but are not limited to, a desired date and a desired form of the analysis output (e.g., Summary Plot).

Once options are selected, a command may be provided to run the trained machine-learning model to determine the likelihood of feature adoption for the selected feature. A real-time update of the status 514 of running the trained machine-learning model may be provided on user interface 500 (e.g., creating data for the model, selecting best feature for the model, feature selection completed, stating model training, model training completed, etc.).

Another form of real-time status provided is reflected in example table 512 whereby number of data points identified amongst data available in a database, number of features selected for the model, and number of positive data points for the model may be communicated to an operator of user interface 500.

Finally, an example output 516 (which is the summary plot selected via option 510) may be displayed on user interface 500. Such output may have a number of features identified with visualization of their effect on the output of the machine learning model, which the likelihood of adoption of MV product (selected via option 504).

Figure 6:
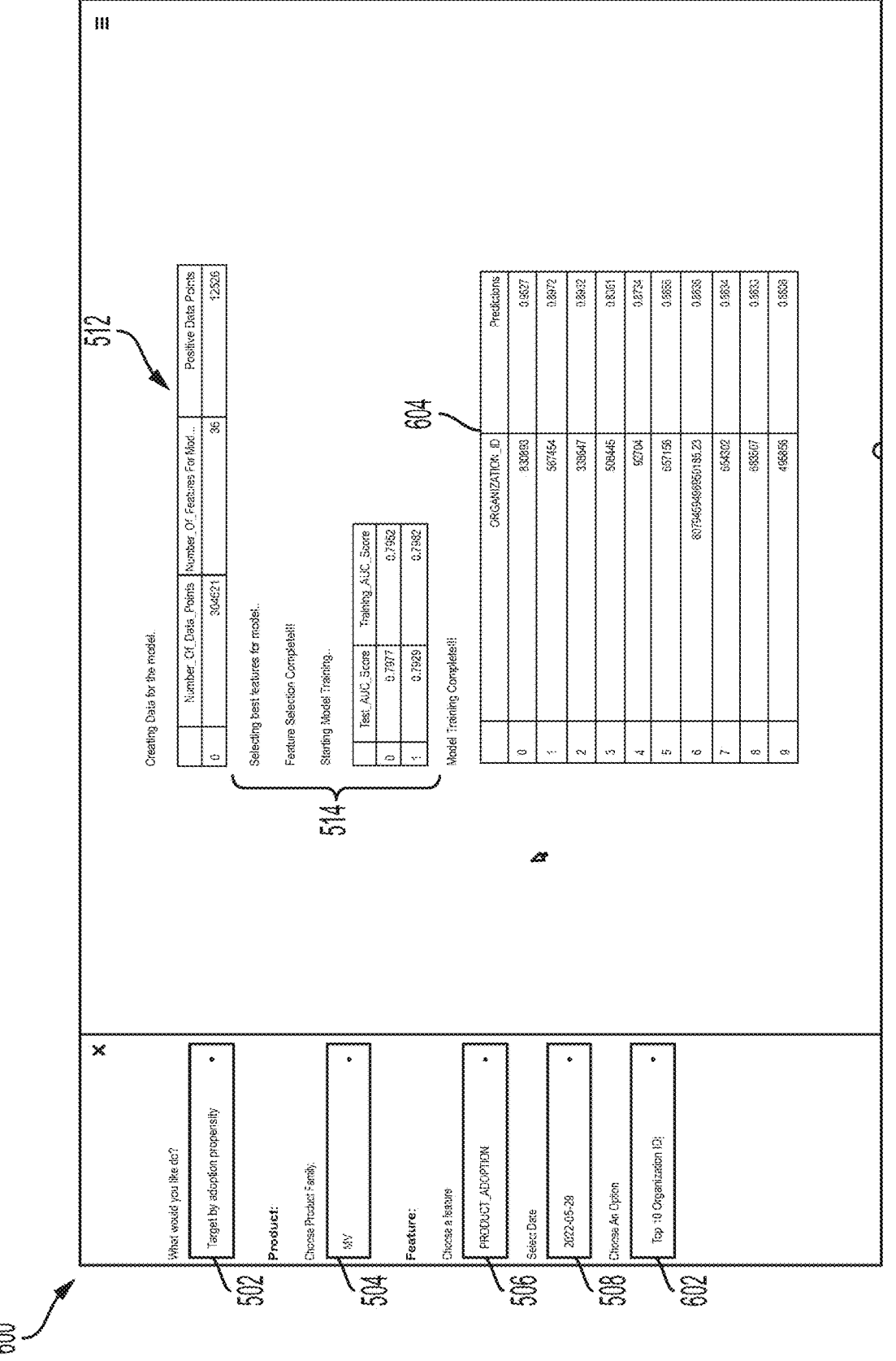
FIG. 6 provides another example output of a trained machine learning algorithm indicative of feature analysis according to some aspects of the present disclosure.

FIG. 6 provides another example output of a trained machine learning algorithm indicative of feature analysis according to some aspects of the present disclosure. Elements of user interface 600 that have the same reference numerals as their counterpart in FIG. 5 will not be further described for sake of brevity as they are the same. In comparison with user interface 500 of FIG. 5, user interface 600 provides option 602, where the requested output of the analysis of feature(s) is top 10 organizations with a likelihood of adoption of the requested feature (e.g., where a non-limiting example feature would be Meraki Video specified via option 504).

Output 604, which is the output of machine learning algorithm described above, can then provide a list of organizations (e.g., listed by organization ID) and a corresponding likelihood of adoption of the specified feature (e.g., which could have been defined on-the-fly) by each organization. In one non-limiting example, the likelihood of adoption can be a numeral number between 0 and 1 with 0 indicating no likelihood of adoption and 1 indicating a 100% adoption. In the alternative, the likelihood of adoption can be presented according to any known or to be developed scale (e.g., as a percentage, as a number within a defined scale such as 0-10, 0-100, etc.).

Figure 7:
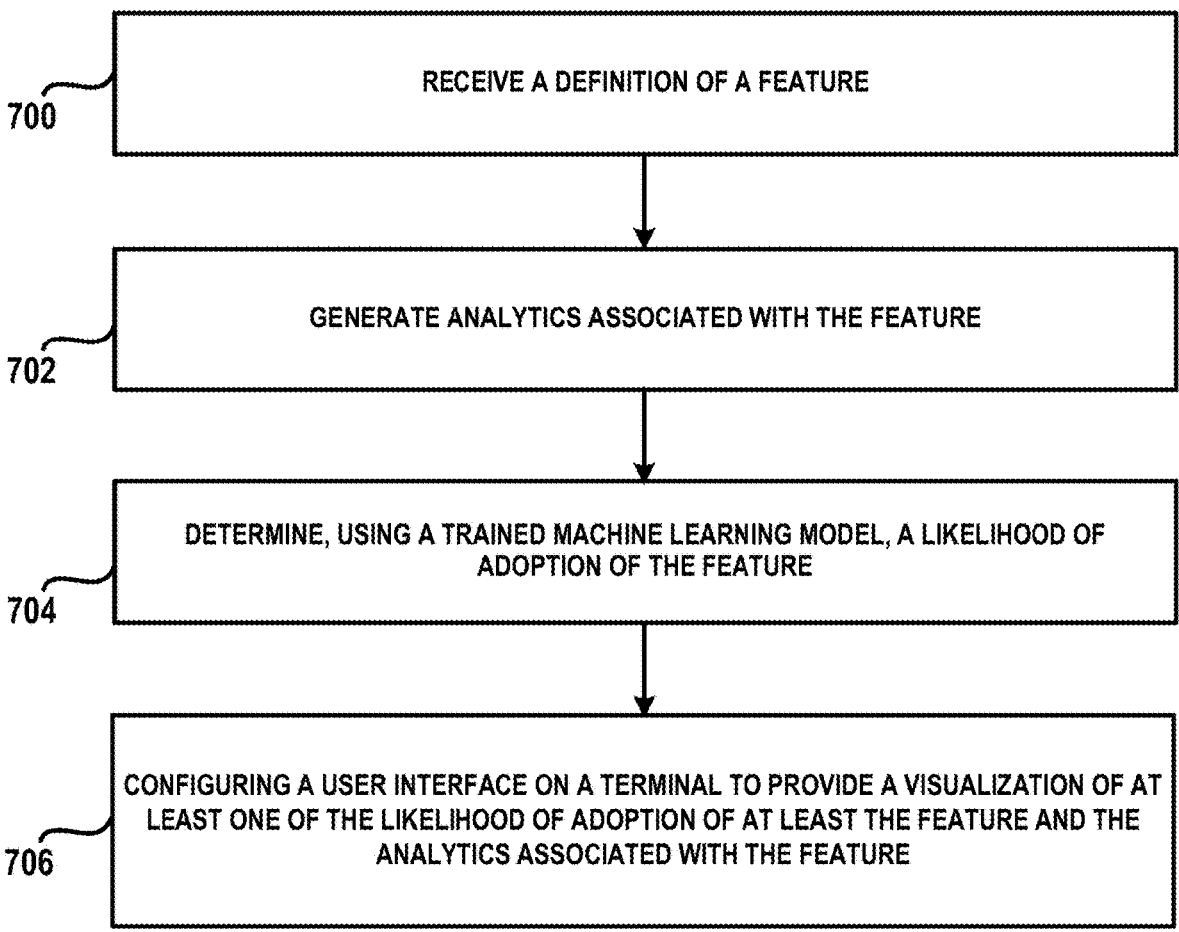
FIG. 7 illustrates an example method of defining features and predicting likelihood of adoption of features according to some aspects of the present disclosure.

FIG. 7 illustrates an example method of defining features and predicting likelihood of adoption of features according to some aspects of the present disclosure. FIG. 7 may be performed by one or more network components configured with appropriate computer-readable instructions, which when executed by one or more processors, cause the network component(s) to perform steps of FIG. 7. For example, example process of FIG. 7 may be performed by network controller appliance 104. Therefore, for purposes of describing the concepts presented herein, FIG. 7 will be described from the perspective of network controller appliance 104 but the present disclosure is not limited thereto.

At step 700, network controller appliance 104 may receive a definition of a feature. In one example, the feature may represent a user query for analytics associated with the feature based on data collected on a plurality of devices in one or more networks. Such devices can be any one or more of network elements described with reference to example network 100 of FIG. 1.

In one example, the first-time definition is a description of attributes associated the feature as described above with reference to FIG. 3A and FIG. 3B. Upon receiving the attributes, network controller appliance 104 may generate the definition.

The feature can be defined for first time (on-the-fly) or may be an existing feature for which analytics are being queried. The on-the-fly feature may be defined per the process of FIGS. 3A and 3B as described above and using a trained machine-learning model such as example neural network 410, which receives the description of the attributes as input, and provides the definition as output.

At step 702, network controller appliance 104 may generate the analytics associated with the feature. In one example, the analytics can include feature usage by organization ID, usage frequency, comparison with other features, etc. Non-limiting examples of generated analytics are shown visually by output 314 of FIG. 3A and/or outputs 360 and 362 of FIG. 3B.

At step 704, network controller appliance 104 may determine, using a trained machine learning model, a likelihood of adoption of the feature defined at step 700, by one or more users of the plurality of devices. In one example, such machine learning model can be a trained neural network such as neural network 410 of FIG. 4. Once trained, such neural network may receive as input, the first-time definition of a feature and provide, as output, the likelihood of adoption of at least the feature. Non-limiting examples of this process are described above with reference to FIGS. 5 and 6.

In one example, the trained machine learning model further receives, as the input, updated information on current utilization of the plurality of devices and/or historical data on device utilization by users of the plurality of devices. In this instance, the likelihood of adoption of at least the feature may be determined based on the first-time definition, the updated information on current utilization of the plurality of devices, and the historical data on device utilization.

At step 706, network controller appliance 104, may configure a user interface (e.g., user interface 500 and/or user interface 600) on a terminal via which network controller appliance 104 may be managed/accessed, to provide a visualization of at least one of the likelihood of adoption of the feature and the analytics associated with the feature. Non-limiting examples of such visualizations include output 516 of FIG. 5 and/or output 604 of FIG. 6.

Figure 8:
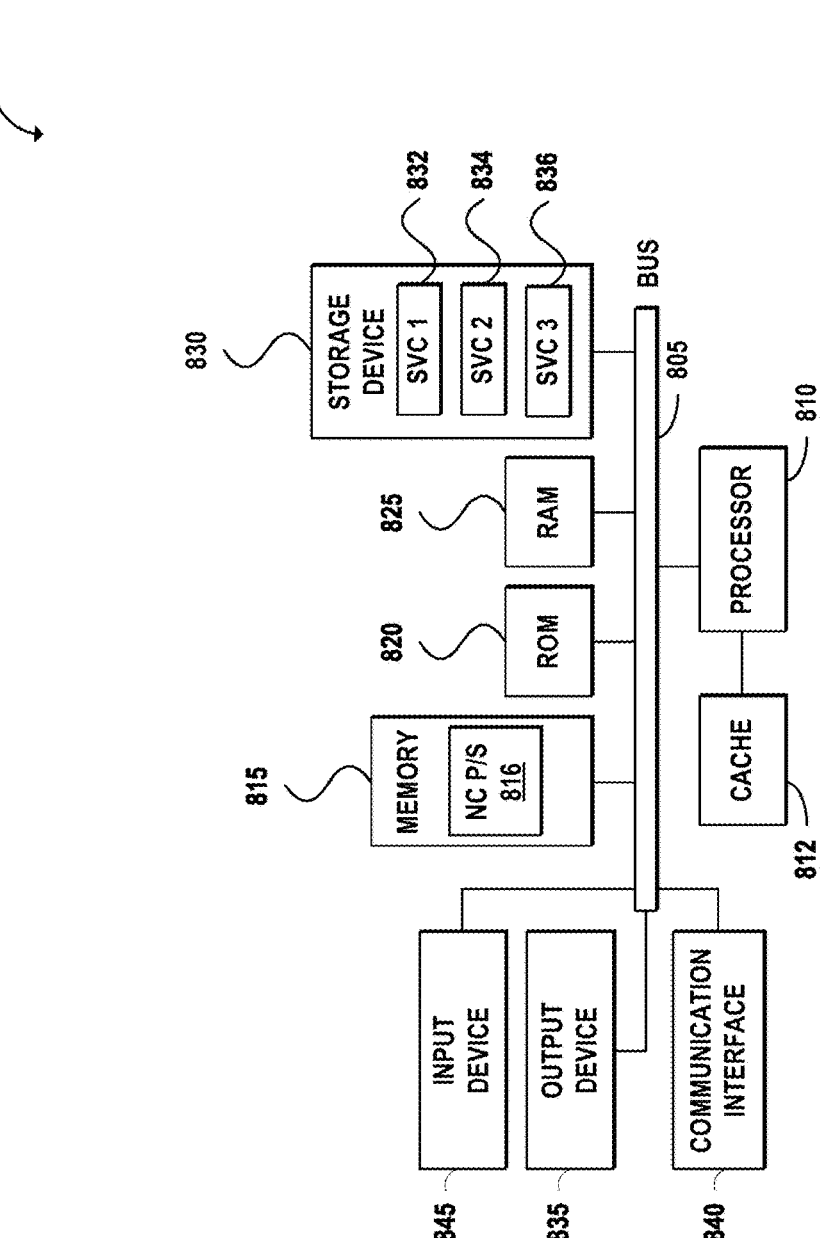
FIG. 8 illustrates an example of a bus computing system, according to some aspects of the present disclosure.

FIG. 8 illustrates an example of a bus computing system, according to some aspects of the present disclosure. Computing system 800 can be utilized as part of any one of the network components described above with reference to FIGS. 1-7. Components of computing system 800 are in electrical communication with each other using a bus 805. Computing system 800 can include a processing unit (CPU or processor) 810 and a system bus 805 that may couple various system components including system memory 815, such as read only memory (ROM) 820 and random access memory (RAM) 825, to processor 810. Computing system 800 can include a cache 812 of high-speed memory connected directly with, in close proximity to, or integrated as part of the processor 810. Computing system 800 can copy data from memory 815, ROM 820, RAM 825, and/or storage device 830 to cache 812 for quick access by processor 810. In this way, cache 812 can provide a performance boost that avoids processor delays while waiting for data. These and other modules can control processor 810 to perform various actions. Other system memory 815 may be available for use as well. Memory 815 can include multiple different types of memory with different performance characteristics. Processor 810 can include any general purpose processor and a hardware module or software module (services), such as services SVC 1 832, SVC 2 834, and SVC 3 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction with computing system 800, an input device 845 can represent any number of input mechanisms, such as a microphone for speech, a touch-protected screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with computing system 800. Communications interface 840 can govern and manage the user input and system output. There may be no restriction on operating on any particular hardware arrangement and therefore the basic features here may easily be substituted for improved hardware or firmware arrangements as they are developed.

Storage device 830 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, storage device 830 can include the software SVCs 832, 834, and 836 for controlling processor 810. Other hardware or software modules are contemplated. Storage device 830 can be connected to system bus 805. In some embodiments, a hardware module that performs a particular function can include a software component stored in a computer-readable medium in connection with the necessary hardware components, such as processor 810, bus 805, output device 835, and so forth, to carry out the function. In a further aspect, memory 815 and/or storage device 830 can also include network connection processes/services (abbreviated as NC P/S) 816 that includes instructions, which, when executed by processor 810, cause processor 810 to implement various functionalities discussed above including that described above with reference to non-limiting steps of FIG. 7.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, media, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general-purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

The invention claimed is:

1. A method of identifying network features comprising:
receiving a first-time definition of a feature, the feature representing a user query for analytics associated with the feature based on data collected on a plurality of devices in one or more networks, wherein the data is stored in a database;
generating the analytics associated with the feature;
determining, using a trained machine learning model, a likelihood of adoption of at least the feature by one or more users of the plurality of devices, wherein the trained machine learning model receives as input the first-time definition and provides, as output, the likelihood of adoption of at least the feature, wherein the likelihood of adoption of the feature is represented by a numerical value that indicates how likely the one or more users are to use the feature in the future; and
configuring a user interface on a terminal to provide real-time status update on running the trained machine learning model for determining the likelihood of adoption of the at least one feature, and to visually display at least one of the likelihood of adoption of at least the feature and the analytics associated with the feature.

2. The method of claim 1, wherein the trained machine learning model further receives, as the input, updated information on current utilization of the plurality of devices.

3. The method of claim 2, wherein the trained machine learning model further receive as the input, historical data on device utilization by users of the plurality of devices.

4. The method of claim 3, wherein determining the likelihood of adoption of at least the feature is based on the first-time definition, the updated information on current utilization of the plurality of devices, and the historical data on device utilization.

5. The method of claim 1, wherein the first-time definition is a description of attributes associated the feature.

6. The method of claim 5, further comprising:
generating the definition based on the description of the attributes.

7. The method of claim 6, wherein the definition is generated using a trained machine learning model that receives the description of the attributes as input, and provides the definition as output.

8. A network controller comprising:
one or more memories having computer-readable instructions stored therein; and
one or more processors configured to execute the computer-readable instructions to:
receive a first-time definition of a feature, the feature representing a user query for analytics associated with the feature based on data collected on a plurality of devices in one or more networks, wherein the data is stored in a database;
generate the analytics associated with the feature;
determine, using a trained machine learning model, a likelihood of adoption of at least the feature by one or more users of the plurality of devices, wherein the trained machine learning model receives as input the first-time definition and provides, as output, the likelihood of adoption of at least the feature, wherein the likelihood of adoption of the feature is represented by a numerical value that indicates how likely the one or more users are to use the feature in the future; and
configure a user interface on a terminal to provide real-time status update on running the trained machine learning model for determining the likelihood of adoption of the at least one feature, and to visually display at least one of the likelihood of adoption of at least the feature and the analytics associated with the feature.

9. The network controller of claim 8, wherein the trained machine learning model further receives, as the input, updated information on current utilization of the plurality of devices.

10. The network controller of claim 9, wherein the trained machine learning model further receives, as the input, historical data on device utilization by users of the plurality of devices.

11. The network controller of claim 10, wherein determining the likelihood of adoption of at least the feature is based on the first-time definition, the updated information on current utilization of the plurality of devices, and the historical data on device utilization.

12. The network controller of claim 8, wherein the first-time definition is a description of attributes associated the feature.

13. The network controller of claim 12, wherein the one or more processors are further configured to execute the computer-readable instructions to generate the definition based on the description of the attributes.

14. The network controller of claim 13, wherein the definition is generated using a trained machine learning model that receives the description of the attributes as input, and provides the definition as output.

15. One or more non-transitory computer-readable media comprising computer-readable instructions, which when executed by one or more processors of a network controller, cause the network controller to:

receive a first-time definition of a feature, the feature representing a user query for analytics associated with the feature based on data collected on a plurality of devices in one or more networks, wherein the data is stored in a database;

generate the analytics associated with the feature;

determine, using a trained machine learning model, a likelihood of adoption of at least the feature by one or more users of the plurality of devices, wherein the trained machine learning model receives as input the first-time definition and provides, as output, the likelihood of adoption of at least the feature, wherein the likelihood of adoption of the feature is represented by a numerical value that indicates how likely the one or more users are to use the feature in the future; and configure a user interface on a terminal to provide real-time status update on running the trained machine learning model for determining the likelihood of adoption of the at least one feature, and to visually display at least one of the likelihood of adoption of at least the feature and the analytics associated with the feature.

16. The one or more non-transitory computer-readable media of claim 15, wherein the trained machine learning model further receives, as the input, updated information on current utilization of the plurality of devices.

17. The one or more non-transitory computer-readable media of claim 16, wherein the trained machine learning model further receives, as the input, historical data on device utilization by users of the plurality of devices.

18. The one or more non-transitory computer-readable media of claim 17, wherein determining the likelihood of adoption of at least the feature is based on the first-time definition, the updated information on current utilization of the plurality of devices, and the historical data on device utilization.

19. The one or more non-transitory computer-readable media of claim 15, wherein the first-time definition is a description of attributes associated the feature.

20. The one or more non-transitory computer-readable media of claim 19, wherein the execution of the computer-readable instructions cause the network controller to generate the definition based on the description of the attributes using a trained machine learning model that receives the description of the attributes as input, and provides the definition as output.

* * * * *